(12) United States Patent
Buswell

(10) Patent No.: US 8,918,653 B2
(45) Date of Patent: Dec. 23, 2014

(54) PROTECTION OF INTERPRETED SOURCE CODE IN VIRTUAL APPLIANCES

(75) Inventor: John I. Buswell, Athens, OH (US)

(73) Assignee: International Business Machines Corporation, Armonk, NY (US)

( * ) Notice: Subject to any disclaimer, the term of this patent is extended or adjusted under 35 U.S.C. 154(b) by 141 days.

(21) Appl. No.: 13/572,402

(22) Filed: Aug. 10, 2012

(65) Prior Publication Data

US 2014/0047244 A1    Feb. 13, 2014

(51) Int. Cl.
*G06F 21/00* (2013.01)
*G06F 21/62* (2013.01)
*G06F 21/57* (2013.01)

(52) U.S. Cl.
CPC .......... *G06F 21/6281* (2013.01); *G06F 21/575* (2013.01)
USPC ........................................................ 713/190

(58) Field of Classification Search
None
See application file for complete search history.

(56) References Cited

U.S. PATENT DOCUMENTS

| | | |
|---|---|---|
| 6,334,189 B1 | 12/2001 | Granger et al. |
| 6,931,634 B2 | 8/2005 | Croix |
| 7,093,119 B2 | 8/2006 | Rhodes |
| 7,467,324 B1 * | 12/2008 | Davda et al. ................. 714/6.12 |
| 7,930,557 B2 | 4/2011 | Novosad |
| 2002/0019935 A1 * | 2/2002 | Andrew et al. ............... 713/165 |
| 2007/0168495 A1 * | 7/2007 | Rothstein et al. ............. 709/224 |
| 2008/0065909 A1 * | 3/2008 | Chen ............................. 713/193 |
| 2009/0089260 A1 * | 4/2009 | Chong et al. ...................... 707/3 |
| 2009/0249331 A1 * | 10/2009 | Davis et al. ....................... 718/1 |

\* cited by examiner

*Primary Examiner* — Gilberto Barron
*Assistant Examiner* — David Le
(74) *Attorney, Agent, or Firm* — Shimokaji & Associates, P.C.

(57) ABSTRACT

Protection of interpreted programming language code filesystem files from access and alteration may be provided by encrypting a file to be protected in a boot sequence. Run-time examination of a virtual appliance may be deterred by hiding the boot sequence in a restricted virtual appliance platform. No shell or filesystem access may be provided. Thus, permissions on a read-only filesystem (for example) may be kept from being altered. The permissions may be set along with filesystem access control lists to prevent unauthorized examination of the source files.

12 Claims, 3 Drawing Sheets

PROTECTION OF INTERPRETED SOURCE CODE IN VIRTUAL APPLIANCES

BACKGROUND

The present invention relates to network virtualization, and more specifically, to the protection of interpreted source code in virtual appliances.

Interpreted programming languages may offer rapid prototyping and development of code. It may be desirable to utilize these types of programming languages as third party open source APIs can be used to rapidly extend functionality to these programming platforms. Due to the interpreted nature of this programming type, it may be easy to maintain compliance with open source licensing such as a Lesser General Public License (LGPL) as code added to these platforms is not statically linked. For example, code associated with one LGPL may be added to in the open source environment, thus potentially rendering the LGPL obsolete or void. Moreover, the source code in interpreted programming languages is fully exposed. This means that anyone who can access the file system may access the source code. This may make it very difficult to utilize and protect proprietary code employed in interpreted programming languages. Thus, protecting the interpreted code in virtual appliances may be desirable.

SUMMARY

According to one embodiment of the present invention, a computer program product for protecting interpreted code in a virtual appliance, the computer program product comprising a computer readable storage medium having computer readable program code embodied therewith, the computer readable program code being configured to: compress a file to be protected into a compressed filesystem file; encrypt an interpreted programming language code filesystem file, wherein the interpreted programming language code filesystem file includes the file to be protected; initiate a startup script employing the encrypted interpreted programming language code filesystem file with the compressed filesystem file; decrypt the interpreted programming language code filesystem file; and run the decrypted interpreted programming language code filesystem file.

According to still yet another embodiment of the present invention, a computing appliance comprises a storage module; a memory module; and a processor, wherein the processor is configured to: compress a file to be protected into a compressed filesystem file stored in the storage module, encrypt the file to be protected with an interpreted programming language code filesystem file, initiate, in the memory, a startup script employing the interpreted programming language code filesystem file with the compressed filesystem file, decrypt the interpreted programming language code filesystem file; and run the decrypted interpreted programming language code filesystem file while preventing access to the compressed file system.

DETAILED DESCRIPTION

Figure 1:
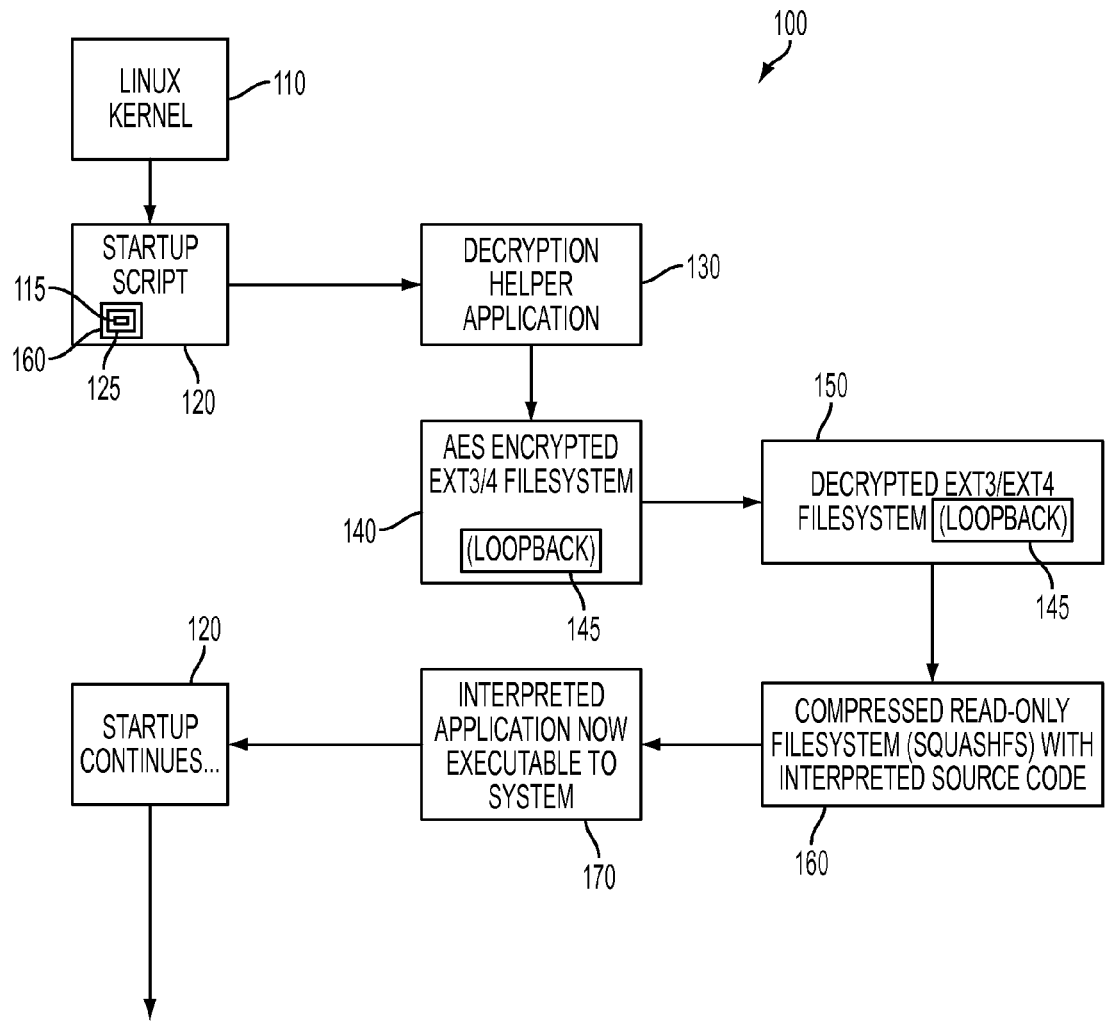
FIG. 1 is a block diagram illustrating a boot sequence within a virtual appliance in accordance with an exemplary embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
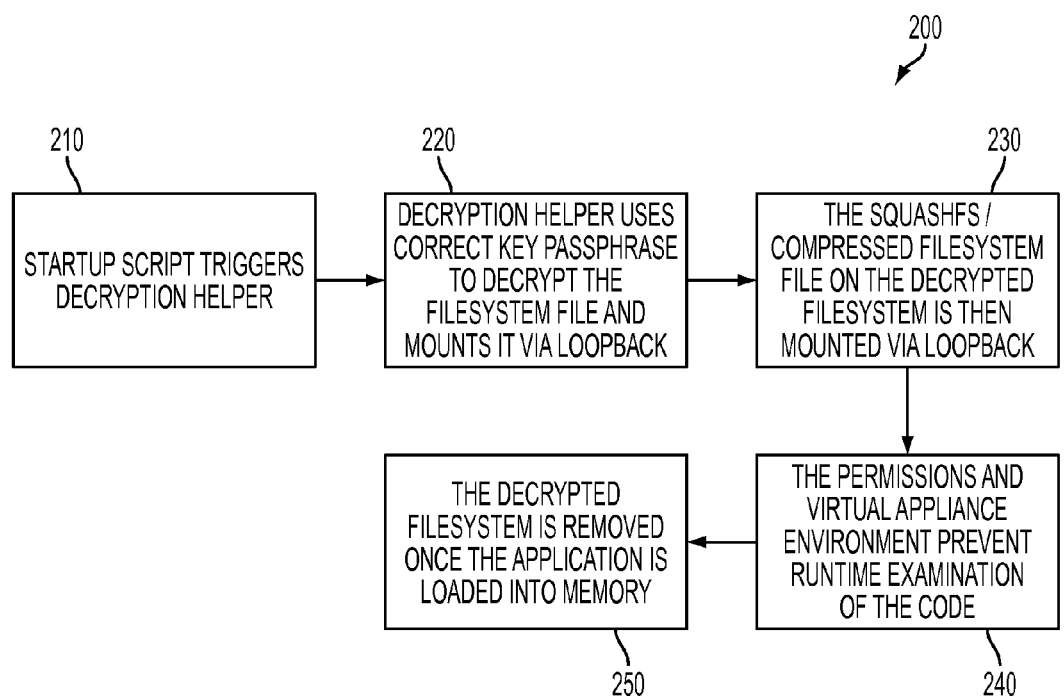
FIG. 2 is a flow chart of a process of protecting a file within an interpreted programming language filesystem in accordance with another exemplary embodiment of the present invention.

Referring now to FIGS. 1 and 2, a boot sequence 100 for use in a virtual appliance (not shown) and a process 200 of protecting code in an interpreted programming language is shown according to an exemplary embodiment of the present invention. The boot sequence 100 may include a plurality of code modules to provide a protected environment for a file 115 to be protected written in a non-compiled language. The file 115 to be protected may comprise, for example, proprietary code that should not be modified. Examples of non-compiled, interpreted programming languages for use in this boot sequence 100 may include, for example Python, Ruby, or Perl. In an exemplary embodiment, the boot sequence 100 is in a restricted operating environment, for example, in a restricted virtual appliance. There may be no direct shell or file system access available during the boot process. In an exemplary embodiment, the boot sequence 100 may contain only the bare minimum components (files, libraries, drivers, etc.) for the virtual appliance to function. For example, the boot sequence 100 may not provide the tools or the ability for the user to access low level parts of the virtual appliance that a conventional operating environment might allow.

In the boot sequence 100, a file 115 to be protected may be compressed into a compressed filesystem file 160. In an exemplary embodiment, the compressed filesystem 160 may be a read-only file. The compressed filesystem file 160 may be, for example, a squashfs type of file. An interpreted programming language code filesystem file 125 may be encrypted prior to the startup process. The encryption of the interpreted programming language code filesystem file 125 may include the compressed filesystem file 160. The encrypted form of the interpreted programming language code filesystem file 125 may be referred to as an encrypted filesystem 140. The encrypted filesystem 140 may employ an encryption cipher, for example an advanced encryption standard (AES) of the "ext3" or "ext4" variety. In other embodiments, the compressed filesystem file 160, with the file 115 to be protected, may be encrypted separately from the interpreted programming language code filesystem file 125. The interpreted programming language filesystem file 125 may be may be encrypted with a universally unique identifier (UUID) as a decryption key passphrase A kernel, for example, a Linux based kernel 110, may hand off control of the encrypted compressed filesystem 160 to a startup script 120, initiating a startup process prior to the virtual appliance needing access to the interpreted programming language code filesystem file 125. The startup script 120 may trigger 210 operation of a compiled decryption helper 130.

In an exemplary embodiment, the decryption helper 130 may be a C based application. The decryption helper 130 may decrypt and mount 220 the encrypted filesystem 140 via loopback, for example, under a Linux environment. A loopback mechanism allows the filesystem 140 to be mapped to a loopback device (not shown) in the virtual appliance simulating a storage device for example. The decryption helper 130 may employ, for example, a 36-character universally unique identifier (UUID) as the decryption key passphrase. The decrypted form of the filesystem 140 may be referred to as a decrypted interpreted programming language code filesystem file 150. The decryption helper application 130 may map the decrypted interpreted programming language code filesystem file 150 to a location where an application expects it to be, and may set any permissions if necessary.

The decrypted interpreted programming language code filesystem file 150 with the compressed file 160 may be mounted 230 via loopback providing the interpreted programming language code filesystem file 125 in an accessible and executable filesystem form 170.

The permissions on this filesystem form 170 may prevent 240 the contents from being copied while mounted and may prevent the file 115 to be protected from being accessed according to the permissions, except for execution. The startup script 120 then continues and the executable filesystem 170 may be removed 250 from the startup script 120 once the filesystem form 170 is run and loaded into memory.

It may be appreciated that examination of the boot sequence 100 may not be possible as the interpreted programming language code filesystem file 125 resides on the compressed filesystem 160 inside the encrypted filesystem file 140. Decryption of the compressed filesystem 160 is unlikely without the secret passphrase. In addition, run-time examination of the virtual appliance may be unlikely as the boot sequence 100 may be hidden by the restricted virtual appliance platform. No shell or filesystem access may be provided. Thus, the permissions on, for example the read-only compressed filesystem 160, may not be alterable. The permissions may be set along with filesystem access control lists to prevent unauthorized examination of the source files (interpreted programming language code filesystem file 125). This may protect the source files even if a malicious user attempts to reverse engineer the solution by trying to store the run-time virtual disks using the virtualization manager, such as vCenter.

Figure 3:
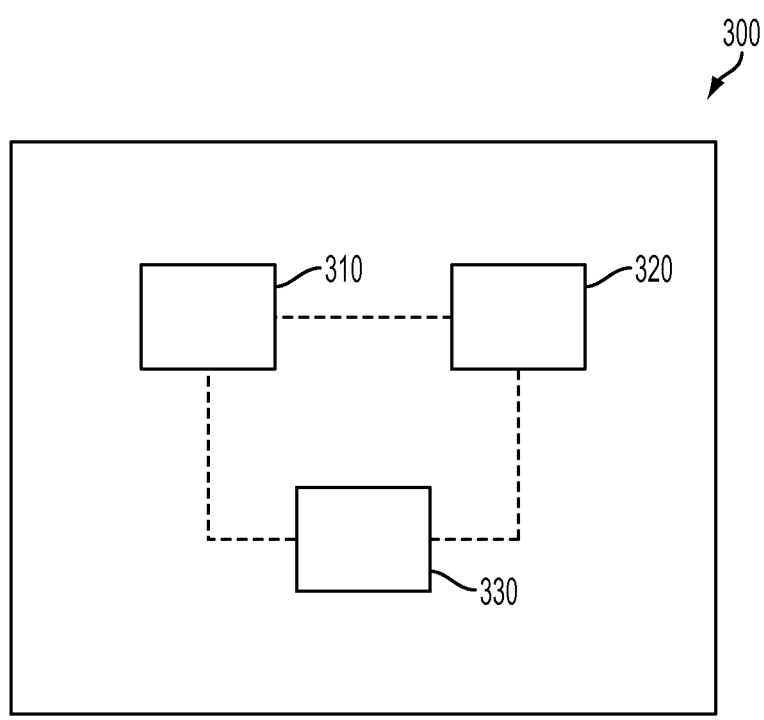
FIG. 3 is a block diagram of a computing appliance employing the boot sequence of FIG. 1 in accordance with yet another exemplary embodiment of the present invention.

Referring now to FIG. 3, a computing appliance 300 is shown with reference to elements of FIG. 1. The computing appliance 300 may include a processor 310, a storage module 320, and a memory module 330. The processor 310 may be configured to: compress the file 115 to be protected into the compressed filesystem file 160; store the compressed file system 160 in the storage module 320; encrypt the file 115 to be protected with an interpreted programming language code filesystem file 125, initiate, in the memory module 330, the startup script 120 employing the interpreted programming language code filesystem file 125; decrypt the interpreted programming language code filesystem file 125; and run the decrypted interpreted programming language code filesystem file 150 while preventing access to the compressed file system 160. The processor 310 may be configured to associate the decrypted interpreted programming language code filesystem file 150 with a loopback device, wherein the loopback device is configured as a virtual storage device within the storage module 320.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer program product for protecting interpreted code in a virtual appliance, the computer program product comprising a non-transitory computer readable storage medium having computer readable program code embodied therewith, the computer readable program code being configured to:

compress a file to be protected into a compressed filesystem file;

encrypt an interpreted programming language code filesystem file prior to execution in a startup script, wherein the encrypted interpreted programming language code filesystem file includes the file to be protected;

initiate the startup script employing the encrypted interpreted programming language code filesystem file with the compressed filesystem file;

decrypt, via the startup script, the encrypted interpreted programming language code filesystem file; and run in the startup script the decrypted interpreted programming language code filesystem file.

2. The computer program product of claim 1, the computer readable program code being configured to:

set permissions on the file to be protected; and prevent the file to be protected from being accessed according to the permissions.

3. The computer program product of claim 1, the computer readable program code being configured to map the encrypted interpreted programming language code filesystem file to a loopback device.

4. The computer program product of claim 1, wherein the interpreted programming language code filesystem file is encrypted with a universally unique identifier (UUID) as a decryption key passphrase.

5. The computer program product of claim 1, the computer readable program code being configured to hand the encrypted interpreted programming language code filesystem file from a kernel to the startup script during a startup process, prior to the virtual appliance's needing access to the interpreted programming language code filesystem file.

6. The computer program product of claim 1, wherein the virtual appliance is run under a Linux operating environment.

7. The computer program product of claim 1, wherein the compressed filesystem file is a squashfs type file.

8. A computing appliance, comprising:

a storage module;

a memory module; and a processor, wherein the processor is configured to:

compress a file to be protected into a compressed filesystem file stored in the storage module, encrypt, prior to execution in a startup script, the file to be protected with an interpreted programming language code filesystem file, initiate, in the memory, a startup script employing the encrypted interpreted programming language code filesystem file with the compressed filesystem file, decrypt the interpreted programming language code filesystem file, and run the decrypted interpreted programming language code filesystem file while preventing access to the compressed file system.

9. The computing appliance of claim 8, wherein the decrypted interpreted programming language code filesystem file is run within a virtual appliance.

10. The computing appliance of claim 8; wherein the decrypted interpreted programming language code filesystem file is run under a Linux based code.

11. The computing appliance of claim 10, wherein the compressed filesystem file is a squashfs file type.

12. The computing appliance of claim 9, wherein the processor is configured to associate the decrypted interpreted programming language code filesystem file with a loopback device configured as a virtual storage device within the storage module.

* * * * *